US008409599B2

(12) United States Patent
Wu et al.

(10) Patent No.: US 8,409,599 B2
(45) Date of Patent: Apr. 2, 2013

(54) SILICONE HYDROGEL LENS WITH A GRAFTED HYDROPHILIC COATING

(75) Inventors: Daqing Wu, Suwanee, GA (US); Xinming Qian, Johns Creek, GA (US); John Dallas Pruitt, Suwanee, GA (US)

(73) Assignee: Novartis AG, Basel (CH)

( * ) Notice: Subject to any disclaimer, the term of this patent is extended or adjusted under 35 U.S.C. 154(b) by 262 days.

(21) Appl. No.: 12/917,504

(22) Filed: Nov. 2, 2010

(65) Prior Publication Data

US 2011/0102736 A1 May 5, 2011

Related U.S. Application Data

(60) Provisional application No. 61/257,912, filed on Nov. 4, 2009.

(51) Int. Cl.
*A61C 8/00* (2006.01)

(52) U.S. Cl. ........................................ 424/422

(58) Field of Classification Search ............... 351/159.1, 351/159.2; 424/422, 423, 427, 400; 427/2.24, 427/2.1, 2.31; 428/420, 411.1
See application file for complete search history.

(56) References Cited

U.S. PATENT DOCUMENTS 3,488,327 A 1/1970 Kollinsky
3,583,950 A 6/1971 Kollinsky
3,598,790 A 8/1971 Kollinsky
3,925,178 A 12/1975 Gesser
4,631,072 A 12/1986 Koller
4,695,608 A 9/1987 Engler
4,791,175 A 12/1988 Janssen
4,968,532 A 11/1990 Janssen
4,978,481 A 12/1990 Janssen
5,262,484 A 11/1993 Coleman
5,292,514 A 3/1994 Capecchi
5,352,714 A 10/1994 Lai
5,408,002 A 4/1995 Coleman
5,476,665 A 12/1995 Dennison
5,760,100 A 6/1998 Nicolson
5,805,264 A 9/1998 Janssen
5,849,811 A 12/1998 Nicolson
6,063,484 A 5/2000 Exsted
6,099,122 A 8/2000 Chabrecek
6,436,481 B1 8/2002 Chabrecek
6,440,571 B1 8/2002 Valint, Jr.
6,447,920 B1 9/2002 Chabrecek
6,465,056 B1 10/2002 Chabrecek
6,521,352 B1 2/2003 Chabrecek
6,582,754 B1 6/2003 Pasic
6,586,038 B1 7/2003 Chabrecek
6,599,559 B1 7/2003 McGee
6,623,747 B1 9/2003 Chatelier
6,623,786 B2 9/2003 Baron
6,630,243 B2 10/2003 Valint, Jr.
6,730,366 B2 5/2004 Lohmann
6,734,321 B2 5/2004 Chabrecek
6,835,410 B2 12/2004 Chabrecek
6,858,310 B2 2/2005 McGee
6,878,399 B2 4/2005 Chabrecek
6,923,978 B2 8/2005 Chatelier
7,556,858 B2 7/2009 Rasmussen
2008/0100796 A1 5/2008 Pruitt
2009/0111942 A1 4/2009 Lang

OTHER PUBLICATIONS

Authors: Sean P. Cullen, Ian C. Mandel and Padma Gopalan Article: Surface-Anchored Poly(2-vinyl-4, 4-dimethyl azlactone) Brushes as Templates for Enzyme Immobilization Published in: Langmuir, 2008, 24 (23) pp. 13701-13709, Publication Date: Oct. 28, 2008 Publisher: ACS Publications—1155 Sixteenth Street N.W., Washington, DC 20036.

PCT International Search Report dated Jan. 4, 2011, International Application No. PCT/US10/55033, International Filing Date Nov. 2, 2010.

PCT Written Opinion of the International Searching Authority dated Jan. 4, 2011, International Application No. PCT/US10/55033, International Filing Date Nov. 2, 2010.

*Primary Examiner* — Hung Dang
(74) *Attorney, Agent, or Firm* — Jian Zhou

(57) ABSTRACT

The invention provides a cost-effective method for applying a hydrophilic coating onto a silicone hydrogel contact lens based on Fenton chemistry. The hydrophilic coating is covalently attached onto the contact lens at room temperature without UV irradiation. The invention also provides silicone hydrogel contact lenses having a hydrophilic coating obtained according to the method of the invention.

18 Claims, No Drawings

SILICONE HYDROGEL LENS WITH A GRAFTED HYDROPHILIC COATING

This application claims the benefit under 35 U.S.C. §119 (e) of U.S. provisional application Ser. No. 61/257,912 filed Nov. 4, 2009, herein incorporated by reference in its entirety.

The present invention generally relates to a cost-effective and time-efficient method for grafting a hydrophilic coating onto a silicone hydrogel contact lens based on Fenton chemistry. In addition, the present invention provides a silicone hydrogel contact lens having a grafted hydrophilic coating.

BACKGROUND

In recent years, soft silicone hydrogel contact lenses become more and more popular because of their high oxygen permeability and comfort. However, a silicone hydrogel material typically has a surface or at least some areas of its surface which is hydrophobic (non-wettable). Hydrophobic surface or surface areas will up take lipids or proteins from the ocular environment and may adhere to the eye. Thus, a silicone hydrogel contact lens will generally require a surface modification. A variety of surface modification approaches have been proposed to render silicone hydrogel contact lenses wettable. One of the approaches is to attach hydrophilic polymers onto contact lenses according to various mechanisms.

For example, U.S. Pat. No. 6,099,122, U.S. Pat. No. 6,436,481, U.S. Pat. No. 6,447,920, U.S. Pat. No. 6,465,056, U.S. Pat. No. 6,521,352, U.S. Pat. No. 6,586,038, U.S. Pat. No. 6,623,747, U.S. Pat. No. 6,730,366, U.S. Pat. No. 6,734,321, U.S. Pat. No. 6,835,410, and U.S. Pat. No. 6,923,978 disclose various methods for grafting a hydrophilic coating onto a contact lens having surface functional groups for photo- or chemical-grafting of hydrophilic polymers, in which the surface functional groups of the contact lens are either inherently present in the lens and derived from a monomer having a functional group or introduced by plasma treatment, plasma-induced graft polymerization, use of a functional photoinitiator, covalently attaching a photoinitiator and photografting of monomers with functional groups, or combinations thereof.

U.S. Pat. No. 6,623,786 discloses a method of photografting a hydrophilic polymer by dipping sequentially in a photoinitiator solution and a hydrophilic macromer solution and then by photocrosslinking the macromer.

U.S. Pat. No. 6,440,571 discloses a method for modifying the surface of a medical device (including a contact lens) to increase its biocompability or hydrophilicity by coating the device with a hydrophilic polymer by means of reaction between reactive functionalities of the hydrophilic polymer and reactive functionalities inherently presented on or near surface of the medical device (i.e., those functionalities derived from a vinylic monomer having a functional group in a lens formulation for making contact lenses.

However, those grafting methods have not been used in the commercial products due to their applicability limited to certain types of silicone hydrogel contact lenses having functional groups inherently presented in the lenses, their complexity, inadequate cost-efficiency, and/or inadequate time-efficiency. Therefore, there is still a need for a method of producing silicone hydrogel contact lenses with wettable and durable coating (surface) in a cost-effective and time-efficient manner.

SUMMARY OF THE INVENTION

The invention, in one aspect, provides a method of applying a hydrophilic coating onto a contact lens, the method of invention comprising the steps of: (a) dipping a contact lens, successively but not in particular order, a coating solution containing a coating material and optionally hydrogen peroxide, water, and a ferrous ion solution containing ferrous ions and optionally hydrogen peroxide, wherein the coating material is at least one member selected from the group consisting of a hydrophilic vinylic monomer, a poly($C_1$-$C_3$ hydroxyalkyl(meth)acrylate)homopolymer, a copolymer of $C_1$-$C_3$ hydroxyalkyl(meth)acrylate with at least one vinylic monomer, a poly($C_1$-$C_5$ hydroxyalkyl(meth)acrylamide)homopolymer, a copolymer of $C_1$-$C_5$ hydroxyalkyl(meth)acrylamide with at least one vinylic monomer, an acrylated polysaccharide, a methacrylated polysaccharide, a homopolymer of a vinyl lactam, a copolymer of at least one vinyl lactam in the presence or in the absence of one or more hydrophilic vinylic comonomers, a homopolymer of acrylamide, a homopolymer of methacrylamide, a copolymer of acrylamide with one or more hydrophilic vinylic monomers, a copolymer of methacrylamide with one or more hydrophilic vinylic monomers, polyethylene oxide, a polyoxyethylene derivative, poly-N—N-dimethylacrylamide, poly(2-ethyl oxazoline), heparin polysaccharides, polysaccharides, polyvinyl alcohols (PVAs), polyamides, polyimides, polylactone, and combination thereof, wherein the coating material is grafted onto the surface of the contact lens by hydroxyl radicals generated in Fenton reaction without UV irradiation.

In another aspect, the invention provides a silicone hydrogel contact lens with a hydrophilic coating obtained according to a method of the invention.

These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

DETAILED DESCRIPTION OF EMBODIMENTS OF THE INVENTION

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel material.

A "silicone hydrogel" refers to a silicone-containing polymeric material which can absorb at least 10 percent by weight of water when it is fully hydrated and is obtained by copolymerization of a polymerizable composition comprising at least one silicone-containing vinylic monomer or at least one silicone-containing macromer or at least one crosslinkable silicone-containing prepolymer.

A "vinylic monomer", as used herein, refers to a low molecular weight compound that has an ethylenically unsaturated group and can be polymerized actinically or thermally. Low molecular weight typically means average molecular weights less than 700 Daltons.

The term "olefinically unsaturated group" or "ethylenically unsaturated group" is employed herein in a broad sense and is intended to encompass any groups containing at least one >C=C< group. Exemplary ethylenically unsaturated groups include without limitation acryloyl

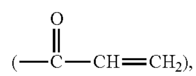

methacryloyl

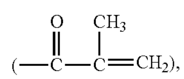

allyl, vinyl

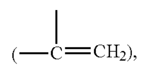

styrenyl, or other C=C containing groups.

The term "(meth)acrylamide" refers to methacrylamide and/or acrylamide.

The term "(meth)acrylate" refers to methacrylate and/or acrylate.

As used herein, "actinically" in reference to curing or polymerizing of a polymerizable composition or material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art.

A "hydrophilic vinylic monomer", as used herein, refers to a vinylic monomer which as a homopolymer typically yields a polymer that is water-soluble or can absorb at least 10 percent by weight water.

A "hydrophobic vinylic monomer", as used herein, refers to a vinylic monomer which as a homopolymer typically yields a polymer that is insoluble in water and can absorb less than 10 percent by weight water.

A "macromer" or "prepolymer" refers to a medium and high molecular weight compound or polymer that contains functional groups capable of undergoing further polymerizing and/or crosslinking reactions. Medium and high molecular weight typically means average molecular weights greater than 700 Daltons. Preferably, a macromer contains ethylenically unsaturated groups and can be polymerized actinically or thermally.

A "polymer" means a material formed by polymerizing/crosslinking one or more monomers or macromers.

A "water contact angle" refers to a water contact angle (measured by Sessile Drop method), which is obtained by averaging measurements of at least 3 individual contact lenses.

The intrinsic "oxygen permeability", Dk, of a material is the rate at which oxygen will pass through a material. In accordance with the invention, the term "oxygen permeability (Dk)" in reference to a material or a contact lens means an apparent oxygen permeability which is measured with a sample (film or lens) of 90 or 100 microns in average thickness over the area being measured according to a coulometric method described in Examples. Oxygen permeability is conventionally expressed in units of barrers, where "barrer" is defined as $[(cm^3\ oxygen)(mm)/(cm^2)(sec)(mm\ Hg)]\times10^{-10}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as $[(cm^3\ oxygen)/(cm^2)(sec)(mm\ Hg)]\times10^{-9}$.

The "ion permeability" through a lens correlates with the Ionoflux Diffusion Coefficient, D (in units of [$mm^2$/min]), which is determined by applying Fick's law as follows:

$$D=-n'/(A\times dc/dx)$$

where n'=rate of ion transport [mol/min]; A=area of lens exposed [$mm^2$]; dc=concentration difference [mol/L]; dx=thickness of lens [mm].

The invention is generally directed to a cost-effective and time-efficient method for making contact lenses with hydrophilic coatings. The invention is partly based on the discovery that Fenton chemistry can be used to apply a hydrophilic coating on a contact lens. According to Fenton chemistry, in a solution of hydrogen peroxide and iron catalyst there are the following two reactions $$Fe^{2+}+H_2O_2\rightarrow Fe^{3+}+OH.+OH^- \quad (1)$$

$$Fe^{3+}+H_2O_2\rightarrow Fe^{2+}+OOH.+H^+ \quad (2)$$

The net result is that two molecules of hydrogen peroxide are converted into two hydroxyl radicals and water in the presence of iron catalyst. It is believed that since most contact lens contains labile hydrogen atoms in the polymer matrix of the contact lenses, the hydroxyl radicals generated in Fenton chemistry can generate secondary radicals, macroradicals, in the polymer matrix of the contact lens at or near the surface of the contact lens. It is further believed that the mobility of the lens macroradicals is greatly restricted within the lens and can be used to initiate graft polymerization of one or more hydrophilic vinylic monomer or graft crosslinking of a hydrophilic polymer onto the lens. Thus lens macroradicals generation efficiency will be a key factor for later grafting propagation.

The present invention can provide the following advantages. First, the whole process is based on wet chemistry and thereby no drying of contact lenses is required. Grafting a hydrophilic coating on a contact lens according to the invention can be carried out in water, an organic solvent, or a water-organic mixture solvent. An organic-water solvent system for Fenton reaction may swell lenses and allow coating materials to be absorbed into lens. Second, the coating process can be accomplished, e.g., by dipping contact lenses sequentially in a series of baths of solutions each for a period of less than about 10 minutes. Such process can be easily implemented in a fully-automated, mass-production environment. Third, a coating obtained according to the method of the invention can have minimal or no uptake of polyhexamethylene biguanide (PHMB) which is an antimicrobial agent widely used in lens care solutions. Higher concentrations of biguanides may cause corneal inflammation and other eye tissue irritation. It would be desirable that a coating on a contact lens would have minimal or no PHMB uptake. Fourth, the coating process for covalent attachment of hydrophilic materials can be accomplished in a very short time period, e.g., from about 10 seconds to about 2 minutes.

The invention, in one aspect, provides a method of applying a hydrophilic coating onto a contact lens at a room temperature without UV irradiation, the method of invention comprising the steps of: (a) dipping a contact lens, successively but not in particular order, a coating solution containing a coating material and optionally hydrogen peroxide, water, and a ferrous ion solution containing ferrous ions and optionally hydrogen peroxide, wherein the coating material is at least one member selected from the group consisting of a hydrophilic vinylic monomer, a poly($C_1$-$C_3$ hydroxyalkyl (meth)acrylate)homopolymer, a copolymer of $C_1$-$C_3$ hydroxyalkyl(meth)acrylate with at least one vinylic monomer, a poly($C_1$-$C_5$ hydroxyalkyl(meth)acrylamide)homopolymer, a copolymer of $C_1$-$C_5$ hydroxyalkyl(meth)acrylamide with at least one vinylic monomer, an acrylated or methacrylated polysaccharide (e.g., methyl cellulose acrylate, or methylcellulose-methylacrylate), a homopolymer of a vinyl lactam (e.g., a poly(N-vinylpyrrolidone)homopolymer), a copolymer of at least one vinyl lactam in the presence or in the absence of one or more hydrophilic vinylic comonomers (a copolymer of N-vinylpyrrolidone with at least one vinylic monomer), a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N—N-dimethylacrylamide, poly(2-ethyl oxazoline), heparin polysaccharides, polysaccharides, polyvinyl alcohols (PVAs), polyamides, polyimides, polylactone, and combination thereof, wherein the coating material is grafted onto the surface of the contact lens by hydroxyl radicals generated in Fenton reaction at room temperature without UV irradiation.

In accordance with the invention, a contact lens can be any contact lens, including soft and hard contact lens. A preferred soft contact lens is silicone hydrogel contact lenses. A person skilled in the art will know well how to make silicone hydrogel contact lenses, e.g., by cast-molding in molds of a lens formulation comprising at least a silicone containing vinylic monomer or macromer, at least one hydrophilic vinylic monomer or macromer, and other necessary components.

Any suitable hydrophilic vinylic monomers can be used in the invention as a coating material. Examples of hydrophilic vinylic monomers are, without this being an exhaustive list, hydroxyl-substituted lower alkyl ($C_1$ to $C_3$) (meth)acrylates, hydroxyl-substituted lower alkyl vinyl ethers, $C_1$ to $C_3$ alkyl (meth)acrylamide, di-($C_1$-$C_3$ alkyl)(meth)acrylamide, N-vinylpyrrole, N-vinyl-2-pyrrolidone, 2-vinyloxazoline, 2-vinyl-4,4'-dialkyloxazolin-5-one, 2- and 4-vinylpyridine, amino (lower alkyl)—(where the term "amino" also includes quaternary ammonium), mono (lower alkylamino) (lower alkyl) and di (lower alkylamino) (lower alkyl)(meth)acrylates, allyl alcohol, N-vinyl $C_1$ to $C_3$ alkylamide, N-vinyl-N—$C_1$ to $C_3$ alkylamide, $C_1$-$C_4$-alkoxy polyethylene glycol (meth)acrylate having a weight average molecular weight of up to 1500, and the like.

Examples of preferred hydrophilic vinylic monomers are N,N-dimethylacrylamide (DMA), N,N-dimethylmethacrylamide (DMMA), 2-acrylamidoglycolic acid, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, aminopropyl methacrylate hydrochloride, dimethylaminoethyl methacrylate (DMAEMA), glycerol methacrylate (GMA), N-vinyl-2-pyrrolidone (NVP), allyl alcohol, vinylpyridine, a $C_1$-$C_4$-alkoxy polyethylene glycol(meth)acrylate having a weight average molecular weight of up to 1500, N-vinyl formamide, N-vinyl acetamide, N-vinyl isopropylamide, N-vinyl-N-methyl acetamide, allyl alcohol, N-vinyl caprolactam, and mixtures thereof.

A hydrophilic polymer can also be used as a coating and can be graft-crosslinked onto a contact lens. Preferred examples of hydrophilic polymers include, but are not limited to, a homopolymer of a vinyl lactam, a copolymer of at least one vinyl lactam in the presence or in the absence of one or more hydrophilic vinylic comonomers, a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N—N-dimethylacrylamide, poly(2-ethyl oxazoline), heparin polysaccharides, polysaccharides, polyvinyl alcohols (PVAs), polyamides, polyimides, polylactone, and mixtures thereof.

Preferably, the hydrophilic polymer as a coating material in the invention is a homopolymer of a vinyl lactam, a copolymer of at least one vinyl lactam in the presence or in the absence of one or more hydrophilic vinylic comonomers, or combinations thereof. Examples of vinyl lactam homo- and copolymers are polyvinylpyrrolidone and copolymer of N-vinylpyrrolidone with one or more vinylic monomers (e.g., a copolymer of N-vinylpyrrolidone and dimethylaminoethylmethacrylate).

The weight-average molecular weight $M_w$ of the hydrophilic polymer is preferably from 5,000 to 500,000, more preferably from 10,000 to 300,000, even more preferably from 20,000 to 100,000.

In one embodiment, a contact is first dipped in a coating solution containing a coating material, then dipped in water, and followed by dipping a ferrous ion solution containing ferrous ions and hydrogen peroxide.

In another embodiment, a contact is first dipped in a ferrous ion solution containing ferrous ions and hydrogen peroxide, then dipped in water, and followed by dipping a coating solution containing a coating material.

In another embodiment, a contact is first dipped in a ferrous ion solution containing ferrous ions and no hydrogen peroxide, then dipped in water, and followed by dipping a coating solution containing a coating material and hydrogen peroxide.

In another embodiment, the ferrous ion solution and/or the coating solution comprises $Sn^{2+}$ ions.

In a preferred embodiment, a contact lens is $Sn^{2+}$-pretreated by contacting the contact lens with a stannous (i.e., $Sn^{2+}$) solution.

Stannous pretreatment can improve the grafting polymerization of a hydrophilic vinylic monomer or the graft crosslinking of a hydrophilic polymer on lenses according to Fenton chemistry. It is believed that tin hydroxide [(Sn(OH)2] and tin hydroxyl chloride [(Sn(OH)Cl] colloidal film is formed during $SnCl_2$-pretreatment of lenses and it may make the lens surface sensitive to attack by radicals generated by Fenton reagent to form macroradicals in the lens polymer matrix.

In another preferred embodiment, a contact lens is pretreated by a vinylic monomer including an anionic group, such as, carboxylic acid or sulphonic acid, followed by the dipping in cation $Fe^{2+}$. It is believed that cation $Fe^{2+}$ will complex with such vinylic monomer, resulting in $Fe^{2+}$ being anchored onto lens surfaces before Fenton reaction occurs. The formed complex will make hydrogen oxide radical generated directly close to lens backbone chain, which will be benefit to macroradical generation and lens grafting efficiency.

In another preferred embodiment, a contact lens is pretreated with a polyanionic polymer to form a layer of the polyanionic polymer on the contact lens, then dipped, in sequence, in a ferrous solution without hydrogen peroxide, in water, and then in a coating solution containing hydrogen peroxide.

The contacting time of a contact lens with a solution used in Fenton graft coating process may last up to about 10 minutes, preferably from about 2 to about 360 seconds.

The molecular weight $M_w$ of the anchoring hydrophilic polymer for forming a prime coating of the invention is at least about 10,000 Daltons, preferably at least about 50,000 Daltons, more preferably at least about 100,000 Daltons, even more preferably from about 500,000 to 5,000,000 Daltons.

In accordance with the invention, before contacting with a solution used in Fenton graft coating process, a silicone hydrogel contact lens can be subjected to extraction with an extraction solvent to remove unpolymerized components from the molded lens, as known by a person skilled in the art. Alternatively, extraction step can be carried out after Fenton graft coating process.

A solution used in Fenton graft coating process can be prepared in dissolving one more reagent in water and adjusting the pH of the resultant solution. It is understood that the solution may contain one or more organic solvents miscible with water as known to a person skilled in the art.

The concentration of a coating material in a solution used in Fenton graft coating process of the invention is preferably from about 0.1% to about 70% by weight in water or in water/organic solvent mixture. The concentration of ferrous ions in a solution used in Fenton graft coating process of the invention is preferably from about 0.1 mM to about 40 mM. The concentration of hydrogen peroxide in a solution used in Fenton graft coating process of the invention is preferably from about 1.0 mM to about 80 mM.

In general, the step of contacting of a contact lens with a solution can be carried at a temperature of from about 10° C. to about 125° C., preferably from about 20° C. to about 80° C., more preferably from about 25° C. to about 35° C., most preferably at room temperature.

In accordance with the invention, a silicone hydrogel contact lens with a Fenton graft coating of the invention is packaged in a lens container containing a packaging solution including a wetting agent or a viscosity-enhancing agent.

In another aspect, the invention provides a contact lens, preferably a silicone hydrogel contact lens. The contact lens of the invention comprises a core material, preferably a silicone hydrogel material, and a hydrophilic coating obtained according to a method of invention.

A silicone hydrogel contact lens of the invention has a wettable surface characterized by having an averaged water contact angle of preferably about 90 degrees or less, more preferably about 80 degrees or less, even more preferably about 70 degrees or less, most preferably about 60 degrees or less.

A silicone hydrogel contact lens of the invention has an oxygen permeability of preferably at least about 50 barrers, more preferably at least about 65 barrers, even more preferably at least about 80 barrers. In accordance with the invention, an oxygen permeability is an apparent (directly measured when testing a sample with a thickness of about 100 microns) oxygen permeability according to procedures described in Examples. A silicone hydrogel contact lens of the invention has a center thickness of about 30 to about 200 microns, more preferably about 40 to about 150 microns, even more preferably about 50 to about 120 microns, and most preferably about 60 to about 110 microns.

A silicone hydrogel contact lens of the invention can further have an elastic modulus of about 1.5 MPa or less, preferably about 1.2 MPa or less, more preferably about 1.0 or less, even more preferably from about 0.3 MPa to about 1.0 MPa.

A silicone hydrogel contact lens of the invention further has an lonoflux Diffusion Coefficient, D, of, preferably at least about $1.5\times10^{-6}$ mm$^2$/min, more preferably at least about $2.6\times10^{-6}$ mm$^2$/min, even more preferably at least about $6.4\times10^{-6}$ mm$^2$/min.

A silicone hydrogel contact lens of the invention further has a water content of preferably from about 18% to about 70%, more preferably from about 20% to about 60% by weight when fully hydrated. The water content of a silicone hydrogel contact lens can be measured according to Bulk Technique as disclosed in U.S. Pat. No. 5,849,811.

Above described various embodiments and preferred embodiments of coating materials, can be used in this aspect of the invention.

The previous disclosure will enable one having ordinary skill in the art to practice the invention. In order to better enable the reader to understand specific embodiments and the advantages thereof, reference to the following examples is suggested.

EXAMPLE 1

Oxygen Permeability Measurements

The oxygen permeability of a lens and oxygen transmissibility of a lens material is determined according to a technique similar to the one described in U.S. Pat. No. 5,760,100 and in an article by Winterton et al., (The Cornea: Transactions of the World Congress on the Cornea 111, H. D. Cavanagh Ed., Raven Press: New York 1988, pp 273-280), both of which are herein incorporated by reference in their entireties. Oxygen fluxes (J) are measured at 34° C. in a wet cell (i.e., gas streams are maintained at about 100% relative humidity) using a Dk1000 instrument (available from Applied Design and Development Co., Norcross, Ga.), or similar analytical instrument. An air stream, having a known percentage of oxygen (e.g., 21%), is passed across one side of the lens at a rate of about 10 to 20 $cm^3$/min., while a nitrogen stream is passed on the opposite side of the lens at a rate of about 10 to 20 $cm^3$/min. A sample is equilibrated in a test media (i.e., saline or distilled water) at the prescribed test temperature for at least 30 minutes prior to measurement but not more than 45 minutes. Any test media used as the overlayer is equilibrated at the prescribed test temperature for at least 30 minutes prior to measurement but not more than 45 minutes. The stir motor's speed is set to 1200±50 rpm, corresponding to an indicated setting of 400±15 on the stepper motor controller. The barometric pressure surrounding the system, $P_{measured}$, is measured. The thickness (t) of the lens in the area being exposed for testing is determined by measuring about 10 locations with a Mitotoya micrometer VL-50, or similar instrument, and averaging the measurements. The oxygen concentration in the nitrogen stream (i.e., oxygen which diffuses through the lens) is measured using the DK1000 instrument. The apparent oxygen permeability of the lens material, $Dk_{app}$, is determined from the following formula:

$$Dk_{app}=Jt/(P_{oxygen})$$

where J=oxygen flux [microliters $O_2$/$cm^2$-minute]

$P_{oxygen}$=($P_{measured}$−$P_{water}$ vapor)=(% $O_2$ in air stream) [mm Hg]=partial pressure of oxygen in the air stream $P_{measured}$=barometric pressure (mm Hg)

$P_{water}$ vapor=0 mm Hg at 34° C. (in a dry cell) (mm Hg)

$P_{water}$ vapor=40 mm Hg at 34° C. (in a wet cell) (mm Hg)

t=average thickness of the lens over the exposed test area (mm)

$Dk_{app}$ is expressed in units of barrers.

The oxygen transmissibility (Dk/t) of the material may be calculated by dividing the oxygen permeability ($Dk_{app}$) by the average thickness (t) of the lens.

Ion Permeability Measurements.

The ion permeability of a lens is measured according to procedures described in U.S. Pat. No. 5,760,100 (herein incorporated by reference in its entirety. The values of ion permeability reported in the following examples are relative ionoflux diffusion coefficients ($D/D_{ref}$) in reference to a lens material, Alsacon, as reference material. Alsacon has an ionoflux diffusion coefficient of $0.314\times10^{-3}$ $mm^2$/minute.

Water Contact Angle Measurements.

Water contact angle on a contact lens is a general measure of the surface hydrophilicity (or wettability) of the contact lens. In particular, a low water contact angle corresponds to more hydrophilic surface. Average contact angles (Sessile Drop) of contact lenses are measured using a VCA 2500 XE contact angle measurement device from AST, Inc., located in Boston, Mass. This equipment is capable of measuring advancing or receding contact angles or sessile (static) contact angles. The measurements are performed on fully hydrated contact lenses and immediately after blot-drying as follows. A contact lens is removed from the vial and washed 3 times in ~200 ml of fresh DI water in order to remove loosely bound packaging additives from the lens surface. The lens is then placed on top of a lint-free clean cloth, dabbed well to remove surface water, mounted on the contact angle measurement pedestal, blown dry with a blast of air and finally the contact angle is measured.

Water Film Break-up-time (WBUT) Test.

WBUT stands for water film break-up-time that is used to contribute to determining the wettability of a lens. WBUT means the amount of time, in seconds, that takes for dry spots to appear on the surface of a lens after it has been removed from water. Test Procedure is described as below. Remove lens from vial or pack; Place 5 drops of saline (PBS, AQuify, ClearCare, etc) on one side of the lens. Turn the lens over and place 5 more drops of saline (PBS, AQuify, ClearCare, etc) on the other side of the lens; Place the lens on the index finger and using your thumb, gently rub the lens for 10 seconds. Thoroughly rinse both sides of the lens with saline. Fill a secondary container, i.e. a lens case or vial, with a minimum amount of saline that will completely cover the entire lens and place lens in container and allow to soak for 5 minutes. Fill the appropriate container with water and allow the lens to equilibrate in the water for 30 seconds. Using tweezers, gently grab the edge of the lens and slowly remove the lens. If the lens folds up or folds in on itself, place the lens back in water until it unfolds and try again. Hold the lens up to the light and using either a stopwatch or clock, begin counting. Once any dry spots begin to appear on the lens surface, either as dry areas that appear when the water cascades off the lens or as small dots that will increase in number with time, stop counting. Place the lens back in water and record the time.

EXAMPLE 2

Preparation of Chain-Extended Polydimethylsiloxane Vinylic Macromer with Terminal Methacrylate Groups (CE-PDMS Macromer)

In the first step, α,ω-bis(2-hydroxyethoxypropyl)-polydimethylsiloxane (Mn=2000, Shin-Etsu, KF-6001a) is capped with isophorone diisocyanate by reacting 49.85 g of α,ω-bis(2-hydroxyethoxypropyl)-polydimethylsiloxane with 11.1 g isophorone diisocyanate (IPDI) in 150 g of dry methyl ethyl ketone (MEK) in the presence of 0.063 g of dibutyltindilaurate (DBTDL). The reaction is kept for 4.5 h at 40° C., forming IPDI-PDMS-IPDI. In the second step, a mixture of 164.8 g of α,ω-bis(2-hydroxyethoxypropyl)-polydimethylsiloxane (Mn=3000, Shin-Etsu, KF-6002) and 50 g of dry MEK are added dropwise to the IPDI-PDMS-IPDI solution to which has been added an additional 0.063 g of DBTDL. The reactor is held for 4.5 h at 40° C., forming HO-PDMS-IPDI-PDMS-IPDI-PDMS-OH. MEK is then removed under reduced pressure. In the third step, the terminal hydroxyl-groups are capped with methacryloyloxyethyl groups in a third step by addition of 7.77 g of isocyanatoethylmethacrylate (IEM) and an additional 0.063 g of DBTDL, forming IEM-PDMS-IPDI-PDMS-IPDI-PDMS-IEM.

Alternate Preparation of CE-PDMS Macromer with Terminal Methacrylate Groups 240.43 g of KF-6001 is added into a 1-L reactor equipped with stirring, thermometer, cryostat, dropping funnel, and nitrogen/vacuum inlet adapter, and then dried by application of high vacuum ($2\times10^{-2}$ mBar). Then, under an atmosphere of dry nitrogen, 320 g of distilled MEK is then added into the reactor and the mixture is stirred thoroughly. 0.235 g of DBTDL are added to the reactor. After the reactor is warmed to 45° C., 45.86 g of IPDI are added through an addition funnel over 10 minutes to the reactor under moderate stirring. The reaction is kept for 2 hours at 60° C. 630 g of KF-6002 dissolved in 452 g of distilled MEK are then added and stirred until a homogeneous solution is formed. 0.235 g of DBTDL are added, and the reactor is held at 55° C. overnight under a blanket of dry nitrogen. The next day, MEK is removed by flash distillation. The reactor is cooled and 22.7 g of IEM are then charged to the reactor followed by 0.235 g of DBTDL. After 3 hours, an additional 3.3 g of IEM are added and the reaction is allowed to proceed overnight. The following day, the reaction mixture is cooled to 18° C. to obtain CE-PDMS macromer.

EXAMPLE 3

Preparation of Contact Lenses with Monomeric Formulation

Into a brown bottle 15.75 g CE-PDMS, 10.25 g N-[tris(trimethylsiloxy)-silylpropyl]acrylamide (Tris-Am), 11.5 g N,N-dimethylacrylamide (DMA), 12 g 1-propanol (1-PrOH) and 0.5 g Darocur 1173 are subsequently weighted and added. The mixture is stirred for 15 minutes at ambient temperature with a magnetic stirrer. After 0.25 g LPEG 2000 (N-(carbonyl-methoxypolyethylene glycol-2000)-1,2-disteaoyl-sn-glycero-3-phosphoethanolamin, sodium salt) is added to the formulation, it is stirred for 15 min at 40° C. with a magnetic stirrer. Then the formulation is filtered with a 5 μm filter. Then 0.05 g Visitint-dispersion (5% Cu phthalcyanine dispersion in TRIS) is added and stirred at 40° C. for 15 min. Formulation is cooled dawn to room temperature for contact lens cast.

Lens is cast in spherical LS-3 Glass/Quartz molds using power of −3.00 D, and a mask diameter 14.29 mm. Cure lenses utilizing the Hamamatsu lamp with an intensity of 16 $mW/cm^2$ for 27 seconds. Intensity is measured without the 330 nm cutoff filter and the filter is then replaced. Lenses are deblocked by rinsing lenses off of molds with deionized water and stored in water until the grafting coat process.

Alternatively, lens cast as below Female portions of polypropylene lens molds are filled with about 75 microliters of a lens-forming material prepared as above, and the molds are closed with the male portion of the polypropylene lens molds (base curve molds). Contact lenses are obtained by curing the closed molds for 5 minutes in a double sided UV cure box equipped with Phillips lights (40 watt, F405) with the top light intensity of about 3.61 $mW/cm^2$ and a bottom light intensity of about 3.54 $mW/cm^2$. Lenses are deblocked by rinsing lenses off of molds with deionized water and stored in water until the grafting coat process.

EXAMPLE 4

Preparation of Contact Lenses with N-vinylpyrrolidone (NVP) (10%) in Formulation A lens formulations and lens are prepared similar to Example 3 but have the following composition: CE-PDMS macromer prepared in Example 3 (31.5%); Tris-Am (20.5%); DMA (13%); Darocur 1173 (1.0%); N-vinylpyrrolidone (NVP) (10%); L-PEG2000 (0.5%), Visitint (0.1%) and isopropanol (2-PrOH) (23.4%). Contact lenses are prepared according to the procedures described in Example 3.

EXAMPLE 5

Preparation of Contact Lenses with Hydroxyethylacrylate (HEA) (6.88%) in Formulation A lens formulations and lens are prepared similar to Example 3 but have the following composition: CE-PDMS macromer prepared in Example 3 (32.04%); Tris-Am (20.38%); DMA (15.71%); 2-hydroxyethylacrylate (HEA) (6.88%); DC1173 (1.00%); methylenebisacrylate (MBA) (0.2%); LPEG2000 (0.5%) and 1-PrOH (23.2%). Contact lenses are prepared according to the procedures described in Example 3.

EXAMPLE 6

Fenton Grafting Coating Process with a Representative Monomer PEG-Ma

Monomer-$Fe^{2+}$ solution: 50 wt to 70 wt % PEG-methacrylate (Mw=360) is dissolved in DI water at room temperature containing 1-20 mM $FeCl_2$.

Monomer-$H_2O_2$ solution: 50 wt to 70 wt % PEG-methacrylate (Mw=360) is dissolved in DI water at room temperature containing 10-40 mM $H_2O_2$.

A contact lens containing NVP prepared Example 4 is immersed in an $FeCl_2$ aqueous solution (20 mM) for about 10 seconds, then rinsed in water bath for about 2 seconds, and finally dipped in a 50% (v/v) representative monomer PEG-methacrylate (Mw=360) aqueous solution in the presence of 40 mM $H_2O_2$ for about 10 seconds. The coated lens is placed in a vial containing PBS and autoclaved at about 121° C. for about 30 minutes. The contact angle of the lens decreases from about 112 degrees (control lens without Fenton grafting coating) to about 80 degrees. The WBUT is around 6 seconds.

Alternatively, the lenses are dipped in PEG-Ma monomer solution for about 2 minutes; then immersed in DI water for about 10 seconds; the lenses are then dipped in 20 mM $Fe^{2+}$ solution for about 2 minutes; then dipped into 40 mM $H_2O_2$ solution for about 10 seconds. Lenses are packaged in PBS and autoclave at 121° C. for about 30 minutes. The sessile contact angle drops from about 112 degrees to about 80 degrees and the WBUT is around 7 seconds.

EXAMPLE 7

Fenton Grafting Coating Process with a Representative Polymer PVP

A contact lens containing NVP prepared in Example 4 is immersed in an $FeCl_2$ aqueous solution (20 mM) containing 8 wt % PVP (Mw 360 k) for about 10 seconds, then dipped into 40 mM $H_2O_2$ aqueous solution for 10 seconds then rinsed in water bath for about 2 min. The coated lens is placed in a vial containing PBS and autoclaved at about 121° C. for about 30 minutes. The contact angle of the lens decreased from about 112 degrees (control lens without Fenton grafting coating) to about 105 degrees. WBUT increased from 0 to around 7 seconds.

EXAMPLE 8

Fenton Grafting Coating in a Mixture of Organic-Water Solvent

Fenton grafting of PEG-MA (Mn 454) is carried out in solutions of water/organic solvents. Results show that water miscible solvents DMF, DMSO, MEK (methyl ethyl ketone), acetonitril and di(ethylene glycol) with a concentration about 20% can be used in the Fenton coating process of the invention. In addition, any reactive surfactants that could be crosslinked by the Fenton reaction. e.g. acrylated or pegylated nonionic surfactant or PVP-PDMS, PEG-PDMS, DMA-PDMS copolymers can be used to graft wettable polymer into lens.

For example, a contact lens containing NVP prepared in Example 4 is immersed in 50 wt % PEG-MA (Mn 454) that is dissolved in 20/80 (v/v, MEK/H2O) solvent containing 20 mM $FeCl_2$ for about 20 seconds. The lens is then dipped into DI water bath for 20 seconds, then immersed in a 40 mM $H_2O_2$ aqueous solution for 50 seconds. The coated lens is placed in a vial containing PBS and autoclaved at about 121° C. for about 30 minutes. The contact angle of the lens is decreased from about 112 degrees (control lens without Fenton grafting coating) to about 90 degrees. The WBUT increases to about 6 seconds.

EXAMPLE 9

Fenton Grafting Coating with Sn(II) Pre-Treatment $SnCl_2$ solution preparation.

A 0.3 M $SnCl_2$ solution (pH 1) is prepared by dissolving $SnCl_2$ in water and then adjusted pH to about 1.0 with 37% HCl. A clear solution is obtained or A 0.3 M $SnCl_2$ solution (pH 1) is prepared by dissolving $SnCl_2$ in a HCl solution which is prepared by adding 40 ml of 37% HCl stock solution in water and adjusted the volume to 1 L with water. A clear solution is obtained.

An NVP contained contact lens prepared in Example 4 is dipped in 0.3 M $SnCl_2$ aqueous solution (pH 1) for about 5 minutes, then dipped in 20 mM $FeCl_2$ aqueous solution (pH 4) for about 10 seconds, then rinsed in water for about 2 seconds, and finally dipped in a 70% (v/v) PEG-methacrylate (Mw=454) aqueous solution (pH 4) in the presence of 40 mM $H_2O_2$ for about 10 seconds. The coated lens is placed in a vial containing PBS and autoclaved at about 121° C. for about 30 minutes. The contact angle of the lens decreases from about 112 degrees (control lens without Fenton grafting coating) to about 46 degrees.

EXAMPLE 10

Fenton Grafting Coating on HEA Containing Lenses with Coordinating Agents AMPSA or MAA Pretreatments HEA-containing contact lenses are prepared according to the procedures described in Example 5.

Fenton Grafting Coating Processes

A. Contact lenses are dipped in a 2-acrylamido-2-methylpropane sulfonic acid (AMPSA) (10% by weight, pH 4) for about 3 minutes.

B. Contact lenses are dipped in a methacrylic acid (MAA) solution (10% by weight, pH 4) for about 3 minutes.

C. Contact lenses are dipped in a AMPSA solution (10% by weight, pH 4) for about 2 minutes; dipped in water for about 2-3 seconds; dipped in a $FeCl_2$ solution (10 mM, PH 4) for about 2 minutes; dipped in a solution (pH 4) containing 10% by weight of Copolymer-845 (copolymer of N-vinylpyrrolidone and dimethylaminoethylmethacrylate) and 30 mM $H_2O_2$ for about 2 minutes.

D1. Contact lenses are dipped in a MAA solution (10% by weight, pH 4) for about 2 minutes; dipped in water for about 2-3 seconds; dipped in a $FeCl_2$ solution (10 mM, PH 4) for about 2 minutes; dipped in a solution (pH 4) containing 10% by weight of Copolymer-845 and then in 30 mM $H_2O_2$ for about 2 minutes.

D2. Contact lenses are dipped in a MAA solution (10% by weight, pH 4) for about 2 minutes; dipped in water for about 2-3 seconds; dipped in a $FeCl_2$ solution (10 mM, PH 4) for about 2 minutes; dipped in a solution (pH 4) containing 10% by weight of Copolymer-845 and then in 30 mM $H_2O_2$ for about 2 minutes.

The coated contact lenses are packaged in a phosphate buffered saline, sealed, and autoclaved at about 121° C. for about 30 minutes. The water film break-up-times (WBUT) and water contact angles of the contact lenses after autoclave are determined and results are reported in Table 1.

TABLE 1

| Coating Process | WBUT (seconds) | Contact Angle (°) |
|---|---|---|
| Control (no coating) | 0 | 124 |
| A | 1 | 120 |
| B | 5 | 104 |
| C | 10 | 118 |
| D1 | 10 | 97 |
| D2 (Repeat D1) | 12 | 119 |

The results in Table 1 show that by using the pretreatment of lenses with 10% MAA or 10% AMPSA, the water film break-up-time is increased from zero to 1-5 seconds. When the MAA or AMPSA pretreated lenses are used for Fenton grafting, the water film break-up-time reaches around 10 seconds.

Other coating materials are also tested in the coating process described above. Among the grafting polymers tested: PVP, PEG-MA and Copolymer-845, 10% Copolymer-845 gives the best results. When the Copolymer-845 concentration is decreased to 5% or when using a lower molecular weight polyvinylpyrrolidone (PVP) with a molecular weight of about 3500 or 90,000 Daltons, similar results are obtained for the WBUT and water contact angle.

EXAMPLE 11

Fenton Grafting Coating on Contact Lens Containing HEA with Sn(II) Pretreatment $SnCl_2$ solution preparation is as Example 9.

HEA-contained contact lens is dipped in a 0.3 M $SnCl_2$ aqueous solution (pH 1) for about 5 minutes, transferred to DI water for 2 min. then dipped in a 20 mM $FeCl_2$ aqueous solution (pH 4) for about 10 seconds, then rinsed in water for about 2 seconds, and finally dipped in a 35% (v/v) PEG-methacrylate (Mw=454) aqueous solution (pH 4) in the presence of 40 mM $H_2O_2$ for about 10 seconds. The coated lens is placed in a vial containing PBS and autoclaved at about 121° C. for about 30 minutes. The contact angle of the lens decreased from about 112 degrees (control lens without Fenton grafting coating) to about 46 degrees.

Contact lenses prepared in Example 5 are used in this Example. Effects of $SnCl_2$ upon the WBUT and sessile contact angle of contact lenses with Fenton grafted coatings are examined. Contact lenses pretreated with $SnCl_2$ are dipped in a solution of $SnCl_2$ (pH 1) for 5 minutes, then transferred into water 2 min before Fenton grafting reaction. Three Fenton grafting coating processes are used as follows.

1. Contact lenses pretreated with $SnCl_2$ then dipped in a solution of a coating material (pH 4) for 2 minutes; dipped in water for 5 seconds; and then dipped in a $FeCl_2$ (10 mM, 2 min) followed by a $H_2O_2$ (30 mM, 2 min) solution (pH 4).

TABLE 2

| | Grafting Polymer | | | | | | | | | | | |
|---|---|---|---|---|---|---|---|---|---|---|---|---|
| | 10% Co845 WBUT (s) | | | 20% PEG-MA (Mw: 454) WBUT (s) | | | 8% PVP-90k WBUT (s) | | | 20% PVP-3500* WBUT (s) | | |
| | Coating Approach# | | | | | | | | | | | |
| | #1 | #2 | #3 | #1 | #2 | #3 | #1 | #2 | #3 | #1 | #2 | #3 |
| No Tin pretreatment | 1 | 1 | 1 | 0 | 0 | 0 | 0 | 0 | 1 | 0 | 0 | 0 |
| $SnCl_2$ pretreatment | 6 | 7 | 8 | 4 | 6 | 4 | 5 | 5 | 5 | 1 | 2 | 4 |

WBUT measured according to the procedures described in Example 1.

TABLE 3

| | Grafting Polymer | | | | | | | | | | | |
|---|---|---|---|---|---|---|---|---|---|---|---|---|
| | 10% Co845 Contact Angle (°) | | | 20% PEG-MA (Mw: 454) Contact Angle (°) | | | 8% PVP-90k Contact Angle (°) | | | 20% PVP-3500 Contact Angle (°) | | |
| | Coating Approach# | | | | | | | | | | | |
| | #1 | #2 | #3 | #1 | #2 | #3 | #1 | #2 | #3 | #1 | #2 | #3 |
| No Tin pretreatment | 114 | 121 | 118 | 121 | 120 | 123 | 108 | 126 | 119 | 122 | 123 | 116 |
| $SnCl_2$ pretreatment | 80 | 90 | 95 | 92 | 60 | 83 | 89 | 84 | 74 | 26 | 72 | 41 |

SnCl2 is prepared by Method B.

Contact angles measured by sessile drop as described in Example 1.

2. Contact lenses pretreated with $SnCl_2$ are dipped in a $FeCl_2$ (10 mM) and $H_2O_2$ (30 mM) solution (pH 4) for 2 minutes; dipped in water for 5 seconds; and then dipped in a solution of a coating material (pH 4) for 2 minutes.

3. Contact lenses pretreated with $SnCl_2$ are dipped in a $FeCl_2$ (30 mM) solution (pH 4) for 2 minutes; dipped in water for 5 seconds; and then dipped in a solution of a coating material (pH 4) with $H_2O_2$ (30 mM) solution (pH 4) for 2 minutes.

The contact lenses Fenton-graft-coated with different coating materials are packaged in phosphate buffered saline (PBS) and sealed and autoclaved at about 121° C. for about 30 minutes. The water film break-up-times (WBUT) and water contact angles of the contact lenses after autoclave are determined and results are reported in Tables 2 and 3 respectively. Grafted lens WBUT averages about 5 seconds, while water contact angles average about 80 degrees. It appears that 10% Copolymer-845 polymer is the best candidate for surface grafting, low molecular PVP is not as advantageous for grafting, and $SnCl_2$ pretreatment can improve the lens surface wettability relative to the absence of $SnCl_2$.

The stability of Fenton-graft-coatings on lenses is assessed by WBUT and WCA (water contact angle) after 5 days rinsing in PBS and is reported in Tables 4 and 5 respectively.

TABLE 4

| | | Grafting Polymer | | | | | | | | |
|---|---|---|---|---|---|---|---|---|---|---|
| | | 10% Co845 WBUT (s) | | | 20% PEG-MA454 WBUT (s) | | | 8% PVP-90k WBUT (s) | | |
| | | Approach # | | | | | | | | |
| | | #1 | #2 | #3 | #1 | #2 | #3 | #1 | #2 | #3 |
| No Tin pretreatment | | 1 | 1 | 1 | 0 | 0 | 0 | 0 | 0 | 1 |
| MAA-pretreatment | $2^{nd}$ day | 1 | — | 10 | | | | | | |
| | $5^{th}$ day | 0 | — | 0 | | | | | | |
| AMPSA pretreatment | $2^{nd}$ day | — | 7 | — | | | | | | |
| | $5^{th}$ day | — | 0 | — | | | | | | |
| 0.3M SnCl2 pretreatment | $2^{nd}$ day | 6 | 7 | 8 | 4 | 6 | 4 | 5 | 5 | 5 |
| | $5^{th}$ day | 2 | 3 | 3 | 0 | 0 | 0 | 0 | 0 | 0 |

WBUT is measured according to the procedures described in Example 1

TABLE 5

| | | Grafting Polymer | | | | | | | | |
|---|---|---|---|---|---|---|---|---|---|---|
| | | 10% Co845 Contact Angle (°) | | | 20% PEG-MA454 Contact Angle (°) Approach # | | | 8% PVP-90k Contact Angle (°) | | |
| | | #1 | #2 | #3 | #1 | #2 | #3 | #1 | #2 | #3 |
| No Tin pretreatment | | 114 | 121 | 118 | 121 | 120 | 123 | 108 | 126 | 119 |
| MAA-pretreatment | $2^{nd}$ day | 120 | — | 119 | | | | | | |
| | $5^{th}$ day | — | — | — | | | | | | |
| AMPSA pretreatment | $2^{nd}$ day | — | 117 | — | | | | | | |
| | $5^{th}$ day | — | — | — | | | | | | |
| 0.3M SnCl2 pretreatment | $2^{nd}$ day | 80 | 90 | 95 | 92 | 60 | 83 | 89 | 84 | 74 |
| | $5^{th}$ day | 83 | 87 | 100 | 89 | 63 | 79 | 85 | 81 | 71 |

SnCl2 is prepared by Method B.
Contact angles measured by sessile drop as described in Example 1.

It is found that after autoclaving, the WBUT drops to zero after 5 days rinsing in PBS for PEG-MA (Mw: 454) and PVP coated lenses, and drops more than 60% for Copolymer-845 coated lenses. This indicates that the lens becomes less wettable after 5 days in PBS. However, the contact angle remains much better then control lenses (71-100 degrees).

EXAMPLE 12

Effect of $SnCl_2$ Pretreatments on the Durability on Fenton Grafted Coatings Using HEA Containing Lenses The contact lenses prepared in Example 5 are used. The coating material is Copolymer-845. 0.3 M SnCl2 solution is prepared according to Method A described in Example 9.

Contact lenses pretreated with $SnCl_2$ are dipped in a solution of $SnCl_2$ (pH 1) for 3 min, 5 minutes and 10 min, then transferred into water 2 min before Fenton grafting. These three groups of contact lenses are pretreated with $SnCl_2$ and non-pretreated control lenses are prepared.

The Three Fenton grafting coating processes, #1, #2 and #3 from Example 11 are used.

The effect of the $SnCl_2$-Pretreatment duration upon the WBUT and water contact angle is examined and results are reported in Table 6. It appears that among the three different pretreatment durations tested, the 5 minute-duration pretreatment provides the best improvement in WBUT and contact angle for all three approaches if 10% Copolymer-845 is used.

TABLE 6

| $SnCl_2$ Pretreatment Duration | Grafting approach# | WBUT (s) | Contact Angle (°) |
|---|---|---|---|
| 0 min | #1 | 1 | 116 |
| 0 min | #2 | 1 | 120 |
| 0 min | #3 | 1 | 117 |
| 3 min | #1 | 0 | 109 |
| 3 min | #2 | 6 | 112 |
| 3 min | #3 | 6 | 82 |
| 5 min | #1 | 6 | 82 |
| 5 min | #2 | 8 | 92 |
| 5 min | #3 | 9 | 93 |
| 10 min | #3 | 4 | 99 |

EXAMPLE 13

Fenton Grafting Effect on Commercial Contact Lens and HEA Containing Lenses

Lotrafilcon A lenses without plasma coating from CIBA Vision (Duluth, Ga., USA) are used in this Example. Other lenses are prepared according to the procedure described in Example 5 from a lens formulation having a composition shown in Table 7.

TABLE 7

| Lens | Lotrafilcon A | Control | 4% HEA | 5.44% HEA | 6.88% HEA | 8.19% HEA | 10% HEA |
|---|---|---|---|---|---|---|---|
| Betacon | 37.42 | 0 | 0 | 0 | 0 | 0 | 0 |
| CE-PDMS | 0 | 31.50 | 36.00 | 34.02 | 32.04 | 34.02 | 29.50 |
| Tris | 14.97 | 0 | 0 | 0 | 0 | 0 | 0 |
| Tris-Am | 0 | 20.50 | 17.50 | 21.69 | 20.38 | 18.94 | 23.50 |
| DMA | 22.46 | 23.00 | 17.50 | 13.85 | 15.71 | 13.85 | 12.00 |
| HEA | 0 | 0 | 4.00 | 5.44 | 6.88 | 8.19 | 10.00 |
| MBA | 0 | 0 | 0.20 | 0.20 | 0 | 0.20 | 0.20 |
| CuP | 0 | 0.10 | 0.10 | 0.10 | 0.10 | 0.10 | 0.10 |
| L-PEG2000 | 0 | 0 | 0.50 | 0.50 | 0.50 | 0.50 | 0.50 |
| DMPC* | 0 | 0.75 | 0 | 0 | 0 | 0 | 0 |
| Darocur 1173 | 0.20 | 1.00 | 1.00 | 1.00 | 1.00 | 1.00 | 1.00 |
| 1-propanol | 24.95 | 23.15 | 23.20 | 23.20 | 23.40 | 23.20 | 23.20 |

*DMPC = 1,2-dimyristoyl-sn-glycero-3-phosphocholine 0.3 M $SnCl_2$ solution is prepared according to Method B described in Example 9. Contact lenses pretreated with $SnCl_2$ are dipped in a solution of $SnCl_2$ (pH 1) for 5 minutes, then transferred into water for 2 minutes before Fenton grafting. Then contact lenses pretreated with $SnCl_2$ are used with the Fenton grafting coating process #2 in example 11.

All of the Fenton-graft-coated lenses are placed in vials containing PBS and autoclaved. Both WBUTs and contact angles are measured after autoclave and storage for 5 days in PBS and the results are reported in Tables 8 and 9. Among the tested lenses there is no significant difference in the WBUT (Table 8), but the CA is reduced for the lenses containing higher amounts of HEA. (Table 9).

TABLE 8

| | WBUT (s) | | | | | | |
|---|---|---|---|---|---|---|---|
| Lens | Lotrafilcon A | Control | 4% HEA | 5.44% HEA | 6.88% HEA | 8.19% HEA | 10% HEA |
| Lens 1 | 2 | 2 | 6 | 3 | 4 | 0 | 1 |
| Lens 2 | — | 3 | 4 | 5 | 3 | 3 | 3 |
| Lens 3 | — | 5 | 3 | 5 | — | 2 | 1 |
| Lens 4 | — | 5 | 1 | 4 | — | — | 2 |
| Lens 5 | — | — | — | — | — | — | 3 |
| Lens 6 | — | — | — | — | — | — | 3 |

$SnCl_2$ is prepared by Method B in Example 5.
WBUT measured according to the procedures described in Example 1.

TABLE 9

| | Water Contact Angle (degrees) | | | | | | |
|---|---|---|---|---|---|---|---|
| Lens | Lotrafilcon A | Control | 4% HEA | 5.44% HEA | 6.88% HEA | 8.19% HEA | 10% HEA |
| Lens 1 | 68 | 51 | 76 | 25 | 64 | 54 | 44 |
| Lens 2 | — | 63 | 87 | 29 | 42 | 35 | 62 |
| Lens 3 | — | 61 | 30 | 44 | — | 58 | 19 |
| Lens 4 | — | 49 | 18 | 35 | — | — | 20 |
| Lens 5 | — | — | — | — | — | — | 27 |
| Lens 6 | — | — | — | — | — | — | 23 |

$SnCl_2$ is prepared by Method B in Example 5.
Contact angles measured by sessile drop as described in Example 1.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part and/or be combined in any manners. Therefore, the spirit and scope of the appended claims should not be limited to the description of the preferred versions contained therein.

What is claimed is:

1. A method of applying a hydrophilic coating onto a silicone hydrogel contact lens, comprising the steps of graft polymerizing or graft crosslinking of a coating material onto the surface of the silicone hydrogel contact lens according to Fenton Chemistry in which hydroxyl radicals OH. and OOH. are generated from hydrogen peroxide in the presence of ferrous ions and used in initiating the graft polymerizing or graft crosslinking of the coating material, wherein the coating material is at least one member selected from the group consisting of a hydrophilic vinylic monomer, a poly($C_1$-$C_3$ hydroxyalkyl(meth) acrylate) homopolymer, a copolymer of $C_1$-$C_3$ hydroxyalkyl(meth)acrylate with at least one vinylic monomer, a poly($C_1$-$C_5$ hydroxyalkyl(meth)acrylamide) homopolymer, a copolymer of $C_1$-$C_5$ hydroxyalkyl(meth)acrylamide with at least one vinylic monomer, an acrylated polysaccharide, a methacrylated polysaccharide, a homopolymer of a vinyl lactam, a copolymer of at least one vinyl lactam in the presence or in the absence of one or more hydrophilic vinylic comonomers, a homopolymer of acrylamide, a homopolymer of methacrylamide, a copolymer of acrylamide with one or more hydrophilic vinylic monomers, a copolymer of methacrylamide with one or more hydrophilic vinylic monomers, polyethylene oxide, a polyoxyethylene derivative, poly-N—N-dimethylacrylamide, poly(2-ethyl oxazoline), heparin polysaccharides, polysaccharides, polyvinyl alcohols (PVAs), polyamides, polyimides, polylactone, and combination thereof, wherein the coating material is covalently attached onto the surface of the contact lens without UV irradiation to form the hydrophilic coating.

2. The method of claim 1, wherein the coating material is a polyvinylpyrrolidone or a copolymer of N-vinylpyrrolidone with one or more vinylic monomer.

3. The method of claim 1, wherein the coating material is a hydrophilic vinylic monomer selected from the group consisting of N,N-dimethylacrylamide, N,N-dimethylmethacrylamide, 2-acrylamidoglycolic acid, 3-acryloylamino-1-propanol, N-hydroxyethyl acrylamide, N—[tris (hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, 2-hydroxyethylmethacrylate, 2-hydroxyethyl acrylate, hydroxypropyl acrylate, hydroxypropyl methacrylate, trimethylammoniurn 2-hydroxy propylmethacrylate hydrochloride, aminopropyl methacrylate hydrochloride, dimethylaminoethyl methacrylate, glycerol methacrylate, N-vinyl-2-pyrrolidone, allyl alcohol, vinylpyridine, a $C_1$-$C_4$-alkoxy polyethylene glycol (meth)acrylate having a weight average molecular weight of up to 1500, N-vinyl formamide, N-vinyl acetamide, N-vinyl isopropylamide, N-vinyl-N-methyl acetamide, allyl alcohol, N-vinyl caprolactam, and mixtures thereof.

4. The method of claim 1, wherein the contact lens is $Sn^{2+}$-pretreated by contacting the contact lens with a $Sn^{2+}$ solution.

5. The method of claim 1, wherein the contact lens is dipped in the order of: (1) in the coating solution containing the coating material; (2) in water; and (3) in a ferrous ion solution containing ferrous ions and hydrogen peroxide.

6. The method of claim 1, wherein the contact lens is dipped in the order of: (1) in a ferrous ion solution containing ferrous ions and hydrogen peroxide; (2) in water; and in a coating solution containing the coating material.

7. The method of claim 6, wherein the ferrous ion solution and/or the coating solution comprises $Sn^{2+}$ ions.

8. The method of claim 1, wherein the contact lens is dipped in the order of: (1) in a ferrous ion solution containing ferrous ions and hydrogen peroxide; (2) in water; and in a coating solution containing the coating material.

9. The method of claim 8, wherein the ferrous ion solution and/or the coating solution comprises $Sn^{2+}$ ions.

10. The method of claim 1, wherein the contact lens is dipped in the order of: (1) in a ferrous ion solution containing ferrous ions and no hydrogen peroxide; (2) in water; and in a coating solution containing the coating material and hydrogen peroxide.

11. The method of claim 10, wherein the ferrous ion solution and/or the coating solution comprises $Sn^{2+}$ ions.

12. The method of claim 5, wherein the ferrous ion solution and/or the coating solution comprises $Sn^{2+}$ ions.

13. The method of claim 1, wherein the contact lens is pretreated with a polyanionic polymer to form a layer of the polyanionic polymer on the contact lens, and subsequently dipped in the order of: (1) in a ferrous solution without hydrogen peroxide; (2) in water; and (3) in a coating solution containing hydrogen peroxide and the coating material.

14. The method of claim 10, wherein the ferrous ion solution and/or the coating solution comprises $Sn^{2+}$ ions.

15. The method of claim 1, wherein the contact lens is dipped in the order of: (1) in a coating solution containing the coating material which is a vinylic monomer including a carboxylic acid or sulphonic acid group; (2) in a ferrous ion solution containing ferrous ions and no hydrogen peroxide; (3) in water; and (4) in a solution containing hydrogen peroxide.

16. The method according to claim 15, wherein the ferrous ion solution and/or the coating solution comprises $Sn^{2+}$ ions.

17. A silicone hydrogel contact lens obtained according to claim 1.

18. The silicone hydrogel contact lens of claim 17, wherein the contact lens has at least one of property selected from the group consisting of an oxygen permeability of at least about 40 barrers, a center thickness of about 30 to about 200 microns, an elastic modulus of about 2.0 MPa or less, an Ionoflux Diffusion Coefficient, D, of at least about $1.5\times10^{-6}$ $mm^2$/min, and a water content of from about 15% to about 70%.

* * * * *